United States Patent [19]

Sullivan

[11] 4,216,110

[45] Aug. 5, 1980

[54] METHOD OF MAKING CRACK-FREE ZIRCONIUM HYDRIDE

[75] Inventor: Richard W. Sullivan, Denver, Colo.

[73] Assignee: The United States of America as represented by the United States Department of Energy, Washington, D.C.

[21] Appl. No.: 591,946

[22] Filed: Nov. 1, 1966

[51] Int. Cl.² ............................................. C01B 6/02
[52] U.S. Cl. ........................... 252/301.1 R; 75/122.5; 75/122.7; 75/177; 423/645
[58] Field of Search ................. 23/204, 360; 176/89, 176/91; 252/301.1; 75/122.7, 122.5, 177; 423/645

[56] References Cited

U.S. PATENT DOCUMENTS

| | | | |
|---|---|---|---|
| 3,018,169 | 1/1962 | Vetrano | 23/204 |
| 3,135,697 | 6/1964 | Simnad et al. | 176/89 X |
| 3,376,107 | 4/1968 | Oka | 23/204 |

OTHER PUBLICATIONS

Journal of the Institute of Metals, vol. 93, 1964–1965, pp. 444–446.

*Primary Examiner*—Brooks H. Hunt
*Attorney, Agent, or Firm*—R. V. Lupo; George H. Lee

[57] ABSTRACT

Crack-free hydrides of zirconium and zirconium-uranium alloys are produced by alloying the zirconium or zirconium-uranium alloy with beryllium, or nickel, or beryllium and scandium, or nickel and scandium, or beryllium and nickel, or beryllium, nickel and scandium and thereafter hydriding.

10 Claims, No Drawings

METHOD OF MAKING CRACK-FREE ZIRCONIUM HYDRIDE

The invention described herein was made in the course of, or under, a contract with the U.S. ATOMIC ENERGY COMMISSION.

This invention relates to the production of hydrides of zirconium and zirconium alloys, and in particular to the production of large crack-free bodies with increased transverse rupture strength. Zirconium hydride has utility as a moderator in thermal nuclear reactors as stated in U.S. Pat. No. 3,018,169, and some alloys of zirconium and the actinide elements are useful as nuclear fuels; particularly the hydrides of alloys consisting of zirconium and a minor amount of uranium are applicable to the small nuclear auxiliary power reactors now being developed in connection with the SNAP program.

Because zirconium hydride is very brittle and has low transverse rupture strength, normal hydriding techniques result in cracking and powdering of the zirconium hydride body. Reference to the above-cited patent will show the involved methods heretofore necessary to produce zirconium hydride. While addition of a minor amount of uranium to form a zirconium-uranium alloy increases the transverse rupture strength as compared with pure zirconium, even zirconium-uranium alloys may not be hydrided by normal techniques without catastrophic cracking of the specimen. One method of solving the cracking problem is to add carbon to the zirconium prior to hydriding. The carbon addition seems to promote grain refinement or, in other words, to prevent excessive grain growth during the hydriding. One drawback of this method is the formation of zirconium carbide resulting in a significant increase in the dissociation pressure of subsequently formed zirconium hydride. The dissociation pressure is that pressure necessary to prevent the loss of hydrogen from a hydrided zirconium specimen. The dissociation pressure varies with change in temperature, amount of hydrogen in the zirconium and change in alloy additions to the zirconium. Obviously, if the zirconium hydride is to be used over long periods of time, an increase in the pressure required to maintain a specific hydrogen content is undesirable.

It is the principal object of this invention to find a method of producing strong, crack-free hydrides of zirconium and zirconium alloys without a significant increase in the dissociation pressure of the hydrided zirconium or zirconium alloy.

Another object of this invention is to find an alloy addition to zirconium or a zirconium-actinide alloy which will be insoluble in both the hydrided and unhydrided phase, remain finely dispersed throughout the zirconium or zirconium-actinide alloy matrix, strengthen the matrix and exhibit a strong grain-refining influence.

The final object of this invention is the production of a zirconium—10 w/o uranium hydride for use in the SNAP program.

The process of this invention comprises alloying various zirconium or zirconium-actinide alloys with different combinations of beryllium, nickel and scandium and hydriding to the desired hydrogen composition.

In the search for means to accomplish the objects of this invention, many different zirconium alloys were fabricated. Each element to be alloyed with either zirconium or a zirconium-actinide alloy was chosen on the basis of its nuclear absorption cross section for thermal neutrons, since the resulting hydride is for use in a thermal nuclear reactor, its crystal system and its solubility in zirconium, zirconium-actinide alloys and the hydrides thereof.

Before the actual alloying was begun, the hydriding process was investigated in order to determine if it could be utilized to control the grain size. A typical hydriding cycle consists of heating a specimen under vacuum to 900° C. or greater, introducing hydrogen into the system until a predetermined pressure is reached and holding all parameters constant until the specimen is saturated with hydrogen. The temperature is then lowered incrementally to allow additional absorption of hydrogen, since for a given pressure zirconium will accept more hydrogen at lower temperatures than at higher temperatures. The weight percent of hydrogen absorbed by the metal may be controlled by the final equilibrium temperature and pressure reached in the hydriding cycle. Temperature control is extremely important, because large temperature gradients in the specimen can produce internal stresses severe enough to result in cracking.

It has been found that the longer a hydride specimen is held at the maximum cycle temperature the larger the grain size. Even when a specimen containing no alloying additions was cold-reduced and recrystallized before hydriding in order to reduce the grain size, consistent results were not obtainable and cracked hydride specimens resulted in a number of runs. Since it appeared that specimen cracking could not be eliminated at comparatively low hydriding temperatures by simple adjustments in the process, various alloys were fabricated and tested.

In all the following experiments the alloy ingots were prepared in nonconsumable electrode arc-melting furnaces. Charges were cleaned by chemical etching or physical abrasion, depending upon the reactivity of the material, and placed in a water-cooled copper boat in a furnace which was evacuated and flushed several times with pure argon. The ingots were cylindrical in shape and longitudinally rotated 180 degrees between each of multiple meltings in order to promote homogeneity. After the ingots were formed, they were cleaned by chemical etching prior to placing them in the hydriding furnace. Hydrogen composition of the hydride specimens were determined by weight gain during hydriding.

The hydriding cycle used in the following experiments was substantially the same. The system was evacuated and flushed at least once with hydrogen and again evacuated to a pressure of one micron or less. During heating of the furnace, the system was kept under dynamic vacuum. When the furnace temperature had reached 500° C., the system was again flushed with hydrogen and, after the furnace had reached 850° C. for at least 15 minutes, hydrogen was admitted to the system at a rate governed by the size of the specimen. For a specimen 0.95 cm in cross section, a period of 1½ hours was allowed for the pressure to reach 650 mm, and a two-hour period was allowed for a specimen 1.75 cm in cross section. During the admission of hydrogen to the system, the temperature was maintained at 850° C. and, when the final pressure of 650 mm was reached, all system parameters were maintained until hydrogen absorption ceased. The hydrogen pressure was maintained constant throughout the cooling cycle which did not exceed 1° C. per minute. The cooling cycle was continued until the desired hydride composition temperature was reached. At that temperature, the system was again equilibrated and the hydrogen supply shut off. The furnace was thereafter cooled at a rate of approximately 0.9° C. per minute to a temperature of about 500° C., at which point the furnace was turned off.

In the following experiments the microstructure of each alloy was examined to determine the effect on the zirconium grain size by the alloy addition. When an alloy produced improved hydriding characteristics, transverse rupture and hydrogen dissociation pressure tests were conducted.

MOLYBDENUM

Alloy compositions of molybdenum-zirconium were prepared in 0.1 w/o increments of molybdenum from 0.4 w/o to 1.0 w/o. Very fine grain structures were produced by the addition of molybdenum to zirconium, but notwithstanding the fine grain structure, all hydrided specimens but one experienced catastrophic cracking. Various hydriding cycles were employed, some specimens were cold-reduced before hydriding and a variety of shapes were used in an attempt to produce crack-free specimens. None of the procedures was successful. From these experiments it may be seen that a fine-grained metal and hydride structure does not necessarily guarantee a crack-free hydride.

TANTALUM

As little as 0.3 w/o tantalum addition to zirconium produced a second phase precipitate in the zirconium, but the grain size of the zirconium-tantalum alloy did not differ from that of zirconium alone. Although the presence of the second phase at the initial stages of hydriding produced some grain refinement, the second phase disappeared during hydriding, and the behavior of the tantalum alloys was approximately the same as that of pure zirconium.

YTTRIUM

Yttrium alloys behaved substantially as the tantalum alloys, although a 1.0 w/o yttrium alloy did have a small grain-refining effect on both the zirconium and the zirconium hydride. In spite of the grain refinement, the incidence of cracking with the yttrium alloys was at least as high as with pure zirconium and cold reduction did not improve the hydriding characteristics of these alloys as it had done with pure zirconium.

NIOBIUM

A niobium precipitate was observed in the as-cast niobium alloys and the grain size was considerably reduced as compared to pure zirconium. The second phase precipitate also appeared in the hydride, but produced no grain refinement, and these alloys could not be hydrided without cracking.

BORON

Boron was selected because it occupies a position adjacent carbon in the Periodic Table and was expected to form zirconium boride particles analogous to the zirconium carbide particles formed when carbon is used as the alloy addition. Very fine equiaxed alpha zirconium grains were observed in the boron alloys in addition to a second phase that appeared to be a eutectic mixture at the beta zirconium grain boundaries. Although the very fine grain size was retained after hydriding, the boron alloys repeatedly cracked, and their hydriding behavior was not much better than that of pure zirconium.

CHROMIUM

Although a slight degree of grain refinement was observed in the chromium alloys before and after hydriding, no improvement in hydriding characteristics was noticed.

LANTHANUM

While the lanthanum alloys showed a slight grain refinement before hydriding, the hydrided specimens had huge grain sizes identical to hydrided zirconium. The hydriding behavior was not significantly different from that of pure zirconium.

COBALT

Cobalt alloys produced a second phase in both the zirconium and zirconium hydride structures. Although the hydriding characteristics of cobalt alloys were somewhat better than pure zirconium, because of the high thermal neutron capture cross section of cobalt, no further experimentation was performed.

SILICON

Both the alloyed zirconium and the hydrided zirconium-silicon alloys produced structures similar to the boron alloys. The hydride grains were very fine with eutectic mixture still visible as a second phase at the beta grain boundaries in the hydride structure. The silicon alloys were very good grain refiners, but the hydriding characteristics were poor. No specimens were prepared which did not crack during hydriding.

VANADIUM

The vanadium alloy produced a finely dispersed second phase throughout the zirconium lattice and even finer dispersion was observed throughout the hydride. Notwithstanding this finely dispersed second phase, the hydride grain size of the vanadium alloys was as large as that of pure zirconium hydride.

OXYGEN

Interstitial oxygen produces hardening of zirconium metal which was hoped would permit hydriding without cracking. The oxygen alloys differed only slightly from that of pure zirconium. Alloys containing approximately 0.25 and 0.50 w/o oxygen could be hydrided without cracking, but other alloys cracked at every occasion.

NITROGEN

Nitrogen alloys showed a considerable degree of grain refinement, and the hydride showed a heavy dispersion of a second phase throughout the lattice. After the first hydride experiment showed good hydriding characteristics for the nitrogen alloys, the equilibrium hydrogen dissociation pressure was determined and found to be increased 60% by the presence of 0.25 w/o nitrogen. This increase in the dissociation pressure is believed to extend to the oxygen alloys also and resulted in abandonment of further experiments with both oxygen and nitrogen alloys.

CALCIUM

Because of the low melting point of calcium, most of the calcium volatilized before a zirconium alloy could be formed. No significant hydriding experiments were performed with calcium alloys.

SCANDIUM

Scandium and zirconium form no intermetallic compound, and they are completely miscible in the liquid state. The presence of scandium had no effect on grain size whatever, and the hydriding behavior of the scandium alloys was no different than that of pure zirconium. Although scandium has a high nuclear absorption cross section for thermal neutrons, scandium-zirconium alloys have an advantage in that they have a significantly lower hydrogen dissociation pressure.

NICKEL

Binary nickel alloys, like the cobalt alloys, have low solid solubility in alpha zirconium, and showed a finer grain size and more irregularly shaped grains than that of pure zirconium. This grain refinement was lost when the material was hydrided. Although nickel had little value as a grain refiner, nickel alloys were consistently hydrided crack-free. Only one of approximately 40 large binary nickel specimens cracked during hydriding. After the improved hydriding behavior of these alloys was observed, experiments were conducted to determine the effect on the hydrogen dissociation pressure. The hydrogen dissociation pressure determinations were made at 800° C. by adding hydrogen in measured batches to weighed specimens. After the system equilibrated and the pressure recorded, the hydrogen composition of the specimen could be determined from the total hydrogen added and the hydrogen remaining in the system void volume. The dissociation pressure of zirconium for various hydrogen concentrations was ascertained for reference purposes. Addition of minor amounts of uranium to zirconium, except for dilution of the alloy, had no effect on the dissociation pressure. It was found that the use of 0.30 w/o nickel produced an increase in hydrogen dissociation pressure of approximately 6% as compared to pure zirconium hydride. This result can be explained in that an intermetallic hydride, ZrNiH, is formed. Since this compound removes some zirconium previously available for coaction with hydrogen, an increase in the hydrogen dissociation pressure is expected. The magnitude of the pressure increase resulting from the addition of nickel was smaller than that resulting from the addition of carbon. Thus it is apparent that the addition of nickel is an improvement as compared to carbon insofar as the dissociation pressure is concerned.

Room temperature transverse rupture strengths were determined by the following experimental procedure in order to compare the nickel and carbon alloys. Three-point loading of the test specimens was employed. Two steel dowel pins were used for the bearing surfaces on the bottom of the specimen, and a steel ball-bearing was used for the point-load bearing surface on top of the specimen. All specimens were examined with a dye penetrant after hydriding to insure that they were crack-free. The top and bottom faces of the specimen were metallographically ground to a flat, smooth surface, and a constant load rate of about 13,000 psi per minute was used.

Table I shows that all the alloy hydrides were stronger than unalloyed zirconium hydride and for nickel alloys a 0.3 w/o composition appeared to be the optimum for good strength and hydriding characteristics, although 0.5 w/o nickel alloys also exhibited superior hydriding characteristics. However, it will be noted that the carbon alloys are stronger than nickel alloys. The $N_H$ values appearing in the table relate to the number of hydrogen atoms $\times 10^{22}/cm^3$ of material.

TABLE I

| Alloy composition | Maximum Temperature | $N_H$ | Strength in psi |
|---|---|---|---|
| Pure Zr | 850° C. (1562° F.) | 6.45 | 6,580 |
| | | 6.56 | 6,220 |
| | | 6.58 | 8,040 |
| Zr-10.0 w/o U-0.40 w/o C | 880° C. (1616° F.) | 5.97 | 30,080 |
| | | 6.00 | 24,950 |
| | | 6.20 | 23,200 |
| | | 6.24 | 18,530 |
| Zr-10.0 w/o U-0.30 w/o Ni | 850° C. (1562° F.) | 5.99 | 17,100 |
| | | 6.02 | 18,980 |
| | | 6.02 | 17,650 |
| | | 6.02 | 19,700 |
| | | 6.17 | 14,680 |
| | | 6.25 | 22,000 |
| | | 6.35 | 25,100 |
| | | 6.41 | 14,210 |
| | | 6.44 | 11,870 |
| | | 6.44 | 8,360 |
| | | 6.44 | 13,850 |
| | | 6.55 | 8,740 |
| | | 6.60 | 12,660 |
| Zr-10.0 w/o U-0.40 w/o Ni | 850° C. (1562° F.) | 6.21 | 23,910 |
| | | 6.22 | 26,040 |
| | | 6.27 | 14,700 |
| | | 6.37 | 16,380 |
| Zr-10.0 w/o U-0.50 w/o Ni | 850° C. (1562° F.) | 6.27 | 14,340 |
| | | 6.45 | 14,920 |

In order to take advantage of the hydriding characteristics of the nickel alloys and circumvent the associated increase in hydrogen dissociation pressure, a ternary zirconium-nickel-scandium alloy was studied. Scandium had no detectable effect on the hydriding behavior nor on the hydride strength but did produce a significant decrease in hydrogen dissociation pressure. The results of the scandium addition are most significant in that the addition of a small amount, considerably less than 0.5 w/o, will eliminate the pressure increase resulting from the use of 0.30 w/o nickel in the alloy.

BERYLLIUM

The binary beryllium-zirconium alloys showed small equiaxed alpha zirconium grains with a eutectic mixture at the beta grain boundaries. Alloys containing various amounts of beryllium were prepared and hydrided. Maximum temperatures of 900° C. and 850° C. were used in the hydriding cycles, and although the specimens hydrided at 900° C. had a slightly larger grain size than those hydrided at 850° C., neither cracked. Since the lower maximum hydriding temperature produced finer grain size, the 850° C. cycle was preferred.

The effect of beryllium on hydrogen dissociation pressure was determined, and it was found that the addition of beryllium like the addition of minor amounts of uranium had no effect on the hydrogen dissociation pressure. This indicates that any eutectic compound formed in a zirconium-beryllium alloy is decomposed during hydriding, leaving the zirconium free to absorb hydrogen and an elemental beryllium residue which functions as a grain refiner. Room temperature transverse rupture tests were conducted to compare the carbon-modified hydride and the beryllium-modified hydride. Results of these tests appear in Table II.

TABLE II

| Alloy Composition | Maximum Temperature | $N_H$ | Strength in psi |
|---|---|---|---|
| Zr-0.40 w/o Be | 880° C. (1616° F.) | 6.00 | 8,190 |
| | 850° C. (1562° F.) | 6.00 | 11,890 |
| | | 6.30 | 20,710 |
| | | 6.40 | 13,350 |
| Zr-10.0 w/o U-0.30 w/o Be | 850° C. (1562° F.) | 5.77 | 10,160 |
| | | 6.60 | 14,930 |
| | 880° C. (1616° F.) | 5.94 | 14,990 |
| | | 6.36 | 18,610 |
| Zr-10.0 w/o U-0.40 w/o C | 880° C. (1616° F.) | 5.97 | 30,080 |
| | | 6.00 | 24,950 |
| | | 6.20 | 23,200 |
| | | 6.24 | 18,530 |

As shown in Table II, the beryllium alloys were not as strong as the carbon alloys and further experimentation was conducted to improve the strength of the beryllium alloys. Two specimens containing 10 w/o uranium and 0.25 w/o beryllium were hydrided to $N_H$ values of 6.24 and 6.26 and their respective strengths were tested at 22,120 and 26,050 psi. Twelve other specimens containing the same proportions along with two specimens containing 0.20 w/o beryllium were hydrided to various $N_H$ values between 6.00 and 6.60. The transverse rupture strengths of these alloys are presented in Table III.

TABLE III

| Alloy Composition | Maximum Temperature | $N_H$ | Strength in psi |
|---|---|---|---|
| Zr-10.0 w/o U-0.20 w/o Be | 850° C.(1562° F.) | 6.22 | 23,370 |
| | | 6.22 | 25,880 |
| Zr-10.0 w/o U-0.25 w/o Be | 850° C. (1562° F.) | 6.04 | 25,020 |
| | | 6.04 | 23,330 |
| | | 6.07 | 26,920 |
| | | 6.20 | 27,630 |
| | | 6.23 | 24,340 |
| | | 6.37 | 27,960 |
| | | 6.37 | 30,340 |
| | | 6.37 | 27,820 |
| | | 6.42 | 23,150 |
| | | 6.52 | 22,700 |
| | | 6.60 | 25,000 |
| | | 6.60 | 26,880 |

As may be seen by comparison of Table I, Table II and Table III, even 0.40 w/o beryllium alloys have superior hydriding characteristics compared to unalloyed zirconium, although 0.25 w/o beryllium alloys are preferred and compare favorably in transverse rupture strength with the carbon alloys.

Although the beryllium alloys exhibited no increase in hydrogen dissociation pressure, the effect of a small addition of scandium was studied. An alloy containing zirconium—10 w/o uranium—0.30 w/o beryllium—0.50 w/o scandium was used for the study. The specimen was hydrided and, when the hydride composition was calculated on the basis of weight of zirconium in the alloy, the pressure over the alloy was approximately 40% less than the pressure over pure zirconium hydride.

BERYLLIUM-NICKEL

Since both beryllium and nickel alloys were effective in improving the hydriding characteristics of zirconium and zirconium-uranium alloys, the effect of adding both beryllium and nickel was studied. The alloy studied was zirconium—10 w/o uranium—0.15 w/o beryllium—0.15 w/o nickel. The grain size of this alloy was smaller than that of either the 0.25 w/o beryllium alloy or the 0.30 w/o nickel alloy and exhibited the same excellent hydriding characteristics as the nickel and beryllium alloys individually. Since the grain size was smaller, it was expected that there would be an increase in the transverse rupture strength for the combined alloys, and Table IV presents the results of these determinations.

TABLE IV

| Alloy Composition | Maximum Temperature | $N_H$ | Strength in psi |
|---|---|---|---|
| Zr-10.0 w/o U-0.15 w/o Be-0.015 w/o Ni | 850° C. (1562° F.) | 6.26 | 30,630 |
| | | 6.26 | 30,030 |
| | 900° C. (1652° F.) | 6.17 | 25,800 |
| | | 6.35 | 25,550 |

Although experiments for the entire range of beryllium-nickel combinations were not performed, the values reported in Table IV seem to indicate that the prediction of improved strength for the beryllium-nickel alloys was correct.

It will be understood that the invention is not intended to be restricted by the scope of the experiments reported herein but only by the claims appended hereto.

What is claimed is:

1. A process for producing crack-free hydrides comprising alloying less than 2.0 w/o of a material selected from the class consisting of beryllium; beryllium and nickel; beryllium and scandium; nickel and scandium; and beryllium, nickel and scandium with zirconium or an alloy of zirconium and up to about 10 w/o of uranium, and thereafter hydriding.

2. The process of claim 1 wherein the alloying material is selected from the class consisting of beryllium; nickel; beryllium and nickel; beryllium and scandium; nickel and scandium; and beryllium, nickel and scandium and the hydriding comprises heating the alloy under vacuum to a temperature between about 850° C. and about 900° C.; providing an atmosphere of hydrogen gas; equilibrating the alloy and the hydrogen gas; cooling the alloy while maintaining constant hydrogen pressure; equilibrating the alloy and the hydrogen gas at the desired hydrogen composition temperature; and cooling the alloy.

3. The process of claim 2 wherein the cooling of the alloy while maintaining constant hydrogen pressure is done at a rate of about 1° C. per minute.

4. The process of claim 3 wherein the cooling of the alloy after equilibrating at the desired hydrogen composition temperature is done at a rate of about 1° C. per minute until the alloy is cooled below about 500° C.

5. The process of claim 4 wherein the alloy is heated under vacuum to a temperature of about 850° C. and the hydrogen atmosphere is at a pressure of about 650 mm Hg.

6. The process of claim 5 wherein the hydride is a hydride of a zirconium—10 w/o uranium—0.1 to 0.5 w/o beryllium—0.0 to 0.5 w/o scandium alloy.

7. The process of claim 5 wherein the hydride is a hydride of a zirconium—10 w/o uranium—0.3 to 1.0 w/o nickel—0.0 to 0.5 w/o scandium alloy.

8. The process of claim 5 wherein the hydride is a hydride of a zirconium—10 w/o uranium—0.1 to 0.4 w/o beryllium—0.0 to 0.5 w/o scandium—0.1 to 0.5 w/o nickel alloy.

9. As an article of manufacture a crack-free hydride of an alloy consisting of 0.1 to 0.5 w/o beryllium—0.0 to 0.5 w/o scandium—0.0 to 1.0 w/o nickel—0.0 to 10 w/o uranium and the balance zirconium.

10. As an article of manufacture a crack-free hydride of an alloy consisting of 0.0 to 0.5 w/o scandium—0.3 to 1.0 w/o nickel—about 10 w/o uranium and the balance zirconium.